3,015,669
DIALKYL ALUMINUM HYDRIDES AND THEIR PRODUCTION
Karl Ziegler, Kaiser Wilhelm Platz 2, Mulheim (Ruhr), Germany, and Hans-Georg Gellert and Eckard Bonitz, Mulheim (Ruhr), Germany; said Bonitz and said Gellert assignors to said Ziegler, Mulheim (Ruhr), Germany
No Drawing. Filed June 21, 1955, Ser. No. 528,117
Claims priority, application Germany June 22, 1954
13 Claims. (Cl. 260—448)

This invention is concerned with the production of dialkyl aluminum hydrides.

German Patent No. 918,928 relates to a process for the production of alkyl aluminum hydrides, in which alkyl aluminum halogen compounds are reacted with lithium hydride or sodium hydride. This process produces the products named in smooth reaction, but it is relatively cumbersome, since it must usually be carried out in the presence of considerable quantities of solvents, in particular, ether. In addition, the process requires the use of alkali hydrides, in the preparation of which certain precautions have to be taken. Hence from the technical aspect, the process referred to is not altogether satisfactory.

It has now been found that dialkyl aluminum hydrides of the general formula $HAlR_2$, wherein R is an alkyl radical, may be produced by simple thermal cracking of aluminum trialkyls at temperatures of from 50 to 200° C., and preferably of from 100 to 180° C.

The invention thus consists in a process for the production of dialkyl aluminum hydrides of the general formula $HAlR_2$, wherein R is an alkyl radical, which process comprises heating an aluminum trialkyl at a temperature of from 50 to 200° C., and preferably of from 100 to 180° C., and thereby splitting off one molecule of olefin from the aluminum trialkyl.

That it is possible to produce dialkyl aluminum hydrides by the process of the invention is surprising since the dialkyl aluminum hydrides are known as very sensitive substances which tend to decompose with splitting off of hydrogen and aluminum. Under the conditions of the process of the invention, however, this decomposition does not take place and it is in fact possible to obtain dialkyl aluminum hydrides by the simple heating of aluminum trialkyls to split off one molecule of olefin therefrom.

The process of the invention is most easily carried out when the aluminum trialkyl starting material contains at least one primary branched radical attached to the aluminum and the branching is present on the carbon atom immediately adjacent to the carbon atom attached to the aluminum as, for example, in the isobutyl radical —$CH_2$—$CH(CH_3)_2$.

If, for example, triisobutyl aluminum is heated to 100° C. or more, isobutene is evolved and pure diisobutyl aluminum hydride remains as final product.

$Al[-CH_2.CH.(CH_3)_2]_3 \rightarrow CH_2= C(CH_3)_2 + HAl[CH_2-CH(CH_3)_2]_2$

Splitting off of the isobutene is facilitated by operating under vacuum. It is also possible to employ a higher temperature for the reaction than that quoted, but at temperatures above 200° C. fairly rapid decomposition of the diisobutyl aluminum hydride takes place, with the formation of isobutene, aluminum and hydrogen. The diisobutyl aluminum hydride is, however, completely stable between 120° C. and this decomposition temperature. It is a colourless liquid which may be distilled under high vacuum. The boiling point is 100–105° C./$10^{-3}$ mm. Triisohexyl aluminum of the formula

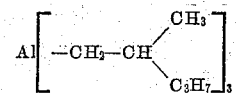

behaves similarly to triisobutyl aluminum and yields diisohexyl aluminum hydride with splitting off of methyl pentene-(1).

As already mentioned the separation of 1 molecule of olefin proceeds particularly easily with the compounds containing branched radicals. The presence of branched alkyl radicals is, however, by no means absolutely necessary to initiate the reaction. It is possible to similarly crack aluminum trialkyls with three normal, primary, unbranched radicals. The ease with which this may be carried out depends on the substituents attached to the aluminum and thus on the boiling point and it may transpire that the temperature at which the desired cracking of the aluminum trialkyl occurs is higher than the decomposition temperature of the dialkyl aluminum hydride. In such cases the thermal cracking of the aluminum trialkyls is carried out in the presence of catalysts. When maintained for some time at 150° C. under vacuum tri-n-hexyl aluminum finally splits off fairly exactly 1 molecule of n-hexene and dihexyl aluminum hydride is obtained as an oily residue which can be distilled only with difficulty.

In many cases, it is necessary, or at least advisable, to promote the splitting off of the olefin by the addition of catalysts. This is, for example, the case with triethyl aluminum. Finely divided metals with large or strongly developed surfaces are preferably, though not exclusively, used as catalysts. For instance, titanium sponge is very active; metallic silver, such as may be obtained by the addition of some silver fluoride to the aluminum trialkyl, is even more active. Furthermore, good results can be obtained with nickel on aluminum, platinum on aluminum and cobalt on aluminum. Triethyl aluminum may be very smoothly converted to diethyl aluminum hydride with such catalysts. This is particularly surprising since during the thermal splitting off of ethylene from triethyl aluminum in the presence of the catalysts named, a temperature of 160–180° C. must still be maintained, and according to all previous experience, decomposition of the diethyl aluminum hydride would have to be taken into account at such high temperatures. In fact, under the conditions of operation set out and particularly as long as a certain quantity of non-decomposed triethyl aluminum is still present, the diethyl aluminum hydride is stable. Its stability, however, diminishes as the triethyl aluminum present in the mixture is consumed. It is, therefore, expedient not to allow the thermal cracking of the triethyl aluminum to proceed to completion but to interrupt the reaction after approximately a 50% conversion. Owing to the difference in boiling points the diethyl aluminum hydride may then be separated from the triethyl aluminum under vacuum without difficulty.

The above mentioned catalysts slowly loses their activity during the process, for which reason it is necessary to add fresh catalyst from time to time. This may, however, be avoided and the life of the catalysts may be greatly extended if the following procedure is adopted. A phase of molten alkali aluminum tetra alkyl, which is insoluble in the aluminum trialkyl, is introduced as a layer below the aluminum trialkyl, e.g. triethyl aluminum. The caatlysts then pass essentially into the lower phase and remain, as has been found, active in this form for a considerably longer period. The alkali aluminum tetra alkyl may be obtained by treating aluminum trialkyl with an alkali metal.

Example 50 gms. triethyl aluminum is heated to 120° C. under nitrogen and mixed with 25 gms. potassium in portions whilst stirring. The potassium melts and becomes covered with a dark layer of separated aluminum. In the further course of this operation the aluminum conglomerates with excess potassium metal to a spongy mass, which may easily be removed from the potassium aluminum tetra ethyl melt at the end of the operation. The melt itself is transparent and colourless. 30 gms. of the product is introduced into a 500 cc. round-bottomed flask furnished with thermometer and reflux condenser. This flask is designed for the reaction proper.

Furthermore, a silver sponge suitable as catalyst is prepared in the following manner. 25 gms. of silver fluoride which has been melted and subsequently reduced to granules of approximately 1 mm. in size by pulverization, is introduced in the cold and under nitrogen into 50 ccs. triethyl aluminum and left therein for approximately 1 hour. The supernatant liquid is now poured or siphoned off and this is followed by washing again with a small quantity of freshly added triethyl aluminum.

The catalyst prepared in this manner is mixed with the potassium aluminum tetra ethyl in the reaction flask. After this, 250 gms. triethyl aluminum is added and the reaction mixture is heated to 180° C., (measured in the liquid). When this temperature has been reached the pressure is carefully reduced by a pump connected to the reflux condenser, until the liquid boils. The gas escaping from the pump is led into a gasometer. It consists of ethylene and some butene formed by the secondary dimerization of the ethylene. As the reaction proceeds the boiling temperature is gradually reduced to 160° C. by suitable adjustment of the pressure. Within the course of 6–8 hours the upper liquid phase in the reaction flask consists of approximately 50% of triethyl aluminum and approximately 50% diethyl aluminum hydride. During the operation occasional samples of the drawn off gases are taken and tested for free hydrogen. If the process is running well, at the most only traces of hydrogen occur. If it is found in larger quantities then the reaction must be immediately interrupted.

The mixture of diethyl aluminum hydride and triethyl aluminum is separated from the potassium aluminum tetra ethyl by pouring off. After this the triethyl aluminum is distilled off in a column under 10 mm. pressure and at a bath temperature of 120° C. Diethyl aluminum hydride remains as residue and may then be further purified by high vacuum distillation. The recovered triethyl aluminum is reintroduced into the process.

We claim:

1. Process for the production of dialkyl aluminum hydrides which comprises heating a reactant substantially solely consisting of an aluminum trialkyl, the alkyl component of which has at least two carbon atoms, to a temperature between about 50 and 200° C. at which the aluminum trialkyl is thermally decomposed splitting off one molecule of an olefin, and recovering the converted reactant comprising a major portion of dialkyl aluminum hydride.

2. Process according to claim 1 in which said aluminum trialkyl contains at least one primary branched alkyl radical attached to the aluminum.

3. Process according to claim 1 in which said heating is effected at a temperature of between about 100 and 180° C.

4. Process according to claim 1 in which said heating is effected in the presence of a finely divided catalyst having an active surface, supported on aluminum, and selected from the group consisting of titanium, silver, nickel, platinum and cobalt.

5. Process according to claim 1 in which said heating is effected in the presence of a catalyst selected from the group consisting of titanium, silver, nickel, platinum and cobalt catalysts.

6. Process according to claim 1 in which said heating is effected under a reduced pressure.

7. Process according to claim 1 in which said heating and thermal decomposition of the aluminum trialkyl is interrupted when about 50% of the aluminum trialkyl is thermally decomposed, and in which said aluminum trialkyl is triethyl aluminum.

8. Process according to claim 1 in which said aluminum trialkyl is triisobutyl aluminum and in which said heating is effected at a temperature of about 100° C. to thereby produce diisobutyl aluminum hydride.

9. Process according to claim 1 in which said aluminum trialkyl is triisohexyl aluminum and in which the recovered dialkyl aluminum hydride is diisohexyl aluminum hydride.

10. Process according to claim 1 in which said aluminum trialkyl is tri-n-hexyl aluminum and in which said heating is effected at a temperature of about 150° C. under vacuum and in which said dialkyl aluminum hydride is dihexyl aluminum hydride.

11. A dialkyl aluminum hydride of the general formula $HAlR_2$ in which R represents a primary branched alkyl radical having at least four carbon atoms.

12. Diisobutyl aluminum hydride.

13. Diisohexyl aluminum hydride.

References Cited in the file of this patent

UNITED STATES PATENTS

| | | |
|---|---|---|
| 2,765,329 | Lindsey | Oct. 2, 1956 |
| 2,900,402 | Johnson | Aug. 18, 1959 |

FOREIGN PATENTS

| | | |
|---|---|---|
| 917,006 | Germany | Aug. 23, 1954 |

OTHER REFERENCES

Yeddanapalli et al.: The Journal of Chemical Physics, vol. 14, No. 1, January 1946, pp. 1–7.

Ziegler: Angewandte Chemie, vol. 64, pp. 323–329, June 21, 1952.

Sidgwick: Chemical Elements and Their Compounds, vol. 1, page 415, Oxford University Press, 1950.